(12) United States Patent
Cross

(10) Patent No.: US 10,989,236 B2
(45) Date of Patent: Apr. 27, 2021

(54) VARIABLE POSITION SHAFT LOCKING DEVICE

(71) Applicant: Wes Cross, San Diego, CA (US)

(72) Inventor: Wes Cross, San Diego, CA (US)

( * ) Notice: Subject to any disclaimer, the term of this patent is extended or adjusted under 35 U.S.C. 154(b) by 699 days.

(21) Appl. No.: 15/898,488

(22) Filed: Feb. 17, 2018

(65) Prior Publication Data

US 2018/0238359 A1    Aug. 23, 2018

Related U.S. Application Data

(60) Provisional application No. 62/461,342, filed on Feb. 21, 2017.

(51) Int. Cl.
*F41C 23/04* (2006.01)
*F16B 2/06* (2006.01)
*F41C 23/14* (2006.01)
*F41C 27/00* (2006.01)
*F16B 7/14* (2006.01)
*F16B 2/10* (2006.01)

(52) U.S. Cl.
CPC ............. *F16B 2/065* (2013.01); *F16B 7/1418* (2013.01); *F41C 23/04* (2013.01); *F41C 23/14* (2013.01); *F41C 27/00* (2013.01); *F16B 2/10* (2013.01)

(58) Field of Classification Search
CPC .......... F41C 23/04; F41C 23/14; F41C 23/00; F41C 23/02; F41C 27/00; F16B 2/10; F16B 7/1418; F16B 7/1472
See application file for complete search history.

(56) References Cited

U.S. PATENT DOCUMENTS

| 1,357,232 | A | * | 11/1920 | Green | F41C 23/14 42/73 |
| 4,660,862 | A | * | 4/1987 | Cassel | F01N 13/1805 285/114 |
| 5,024,303 | A | * | 6/1991 | Kosloff | E05C 17/30 16/82 |
| 5,331,718 | A | * | 7/1994 | Gilbert | E05C 17/30 16/82 |
| 5,634,619 | A | * | 6/1997 | Alessi | A47B 57/565 248/219.3 |
| 6,010,144 | A | * | 1/2000 | Breslin | B60D 1/155 280/491.5 |
| 7,398,616 | B1 | * | 7/2008 | Weir | F41C 23/04 42/71.01 |
| 7,640,688 | B2 | * | 1/2010 | Oz | F41C 23/14 42/73 |
| 8,769,855 | B2 | * | 7/2014 | Law | F41C 23/04 42/75.03 |
| 8,984,791 | B1 | * | 3/2015 | Leslie | F41C 23/04 42/73 |

(Continued)

FOREIGN PATENT DOCUMENTS

WO    WO 2016/115209    *   7/2016    ............. F41C 23/04

*Primary Examiner* — Michael P Ferguson

(57) ABSTRACT

In broad embodiment, the present invention is a mechanism that allows one to impede the movement of a firearms adjustable and or collapsible butt stock. The device wraps around the buffer tube or stock shaft of a firearm and prevents to the movement of the previously adjustable portion of the firearm stock. The variable shaft locking device can be easily attached and removed, and allows a user to temporarily "lock" the adjustable portion without damaging the firearm or impeding its functionality.

8 Claims, 3 Drawing Sheets

(56) References Cited

U.S. PATENT DOCUMENTS

| | | | | |
|---|---|---|---|---|
| 8,991,088 B1* | 3/2015 | Young | ............... | F41A 25/00 |
| | | | | 42/75.03 |
| 9,360,272 B2* | 6/2016 | Hopkins | ............ | F41C 23/20 |
| 9,664,477 B1* | 5/2017 | Reavis, III | ........... | F41C 23/04 |
| 9,746,282 B1* | 8/2017 | Huang | ............... | F41C 23/20 |
| 10,451,380 B2* | 10/2019 | Vanek | ............... | F41C 23/04 |
| 2005/0099001 A1* | 5/2005 | Cassel | ............. | F16L 21/005 |
| | | | | 285/23 |
| 2005/0268516 A1* | 12/2005 | Nelson | ............... | F41G 1/00 |
| | | | | 42/73 |
| 2017/0261286 A1* | 9/2017 | Galloway | ............ | F41J 5/10 |

* cited by examiner

VARIABLE POSITION SHAFT LOCKING DEVICE

CROSS REFERENCE TO RELATED APPLICATIONS

This application claims priority back to U.S. Provisional Application No. 62/461,342, filed Feb. 21, 2017, a copy of which is attached to this submittal and the contents of which are incorporated by reference into this application.

STATEMENT REGARDING FEDERALLY SPONSORED RESEARCH OR DEVELOPMENT

This invention was not federally sponsored.

BACKGROUND OF THE INVENTION

The present invention is in the technical field of firearms. More particularly, the present invention is in the technical field of firearm stocks. More particularly still, the present invention is in the field of firearm stocks, whose shoulder rest and or rear stock assembly, is adjustable and or collapsible.

Semi-automatic firearms have been known for a long time. The first semi-automatic rifle was introduced in 1885. The M-16 automatic rifle has been used by the military for years. A civilian version of the M-16 is known as the AR-15 and is a semi-automatic rifle. The AR-15 has been manufactured and sold to civilians for many years. In recent years there have been many new laws that apply to the civilian owned AR-15 firearm. One such law has created a need for the fixing of a previously adjustable or collapsible stock of the firearm. Currently the way to fix these rear stocks that were adjustable or collapsible is to drill, rivet, glue or otherwise modify the existing stock to prevent adjustability or collapsibility.

The present invention's function is to stop the collapsibility and or adjustability of a firearms rear stock assembly. The present invention wraps around the buffer tube and or stock shaft of a firearm and attaches at the base in such a way that the adjustable portion of the firearms stock can no longer be moved or adjusted. The advantage of the present invention, compared to the current method, which is riveting, gluing or otherwise damaging a rear stock assembly, one can now easily attach the present invention, in order to impede the movement of the adjustable and or collapsible butt stock without damaging the functionality of an adjustable and or collapsible but stock rear stock's assembly.

The present invention is also advantageous to those individuals who travel between differing states, states whose laws pertaining to AR-15 style rifles differ. In the instance of traveling between states who regulate the functionality of the rear but stock and those states who do not regulate, one may simply add or remove the present invention in order to conform to the states particular law and or the individual's preference, without the fear of damaging or permanently breaking the mechanism that makes the rear stock adjustable or collapsible.

SUMMARY OF THE INVENTION

The present invention is a buffer tube and or stock shaft locking device, for a weapons collapsible or adjustable stock. The present invention allows for the safe and easy locking of an adjustable or collapsible stock, transforming the formally adjustable and or collapsible stock in to a fixed stock by installation of the present invention. The present invention wraps around the buffer tube or stock shaft. When the present invention is wrapped around the buffer tube and or stock shaft, the present invention is secured with a fastener in such a way that the present invention cannot be moved from its position on the firearms buffer tube and or stock shaft. The present invention hinges around a pin and pinches the buffer tube and or stock shaft when a fastener is tightened, thus creating sufficient surface tension to prevent movement of the present invention in the forward and backward direction, a set screw is then driven in to the adjustable and or collapsible butt stock, fixing the adjustable and or collapsible butt stock to the immobile present invention. The present invention being fixed on the buffer tube and or stock shaft, impedes the movement of the previously adjustable or collapsible feature that was original to the rear stock assembly.

DETAILED DESCRIPTION OF THE FIRST EMBODIMENT

Figure 1:
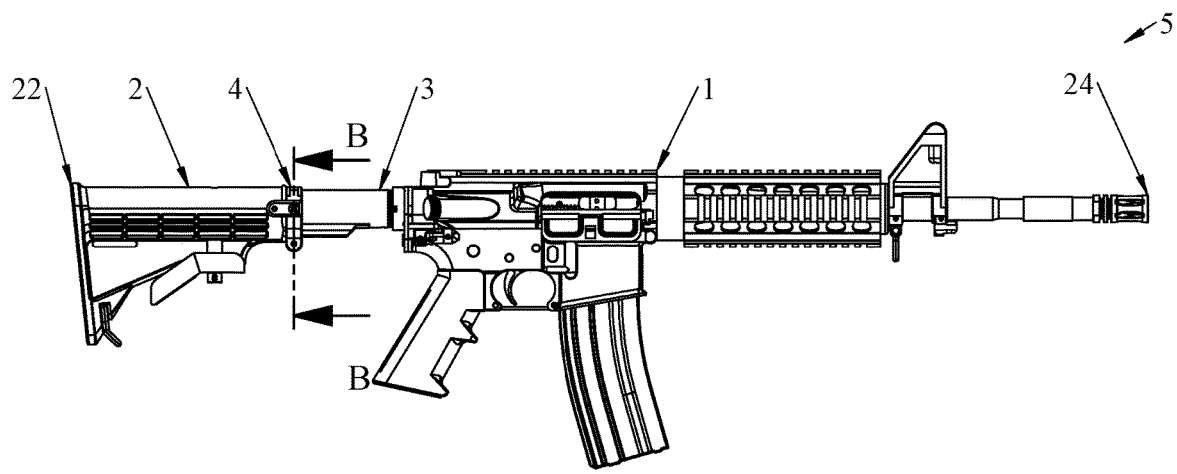
FIG. 1 is a side view of the present embodiment, installed on a AR-15 style firearms rear stock.

The present invention will now be described in detail with reference to the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

Since the basic firearm is of a well-known type, only those parts of the firearm essential to an understanding of the invention will be described in detail. Although the present invention will be described with reference to the exemplary embodiments shown in the drawings, it should be understood that the present invention can be embodied in many alternate forms or embodiments. In addition, any suitable size, shape or type of elements or materials could be used.

The present invention is a buffer tube and or stock shaft locking device, for a weapons collapsible or adjustable stock. The present invention allows for the safe and easy locking of an adjustable or collapsible stock, transforming the formally adjustable and or collapsible stock in to a fixed stock by installation of the present invention. The present invention wraps around the buffer tube or stock shaft. When the present invention is wrapped around the buffer tube and or stock shaft, the present invention is secured with a fastener in such a way that the present invention cannot be moved from its position on the firearms buffer tube and or stock shaft. The present invention hinges around a pin and pinches the buffer tube and or stock shaft when a fastener is tightened, thus creating sufficient surface tension to prevent movement of the present invention in the forward and backward direction, a set screw is then driven in to the adjustable and or collapsible butt stock, fixing the adjustable and or collapsible butt stock to the immobile present invention. The present invention being fixed on the buffer tube and or stock shaft, impedes the movement of the previously adjustable or collapsible feature that was original to the rear stock assembly.

FIG. 1. Referring now to the present embodiment 4 in more detail, in FIG. 1 shows a side view of the present embodiment 4 installed on a AR-15 style firearm 1, 5. The present embodiment 4 is shown installed on the rear stock assembly's 22 buffer tube and or stock shaft 3, in front of the adjustable and or collapsible butt stock 2. The rear stock assembly 22 typically consists of a buffer tube and or stock shaft 3 and an adjustable and or collapsible butt stock 2, as well as additional parts not necessary to this embodiment's comprehension. The rear stock assembly 22 is located at the back of an AR-15 style firearm 1, opposite the front of the firearm 24.

Figure 2:
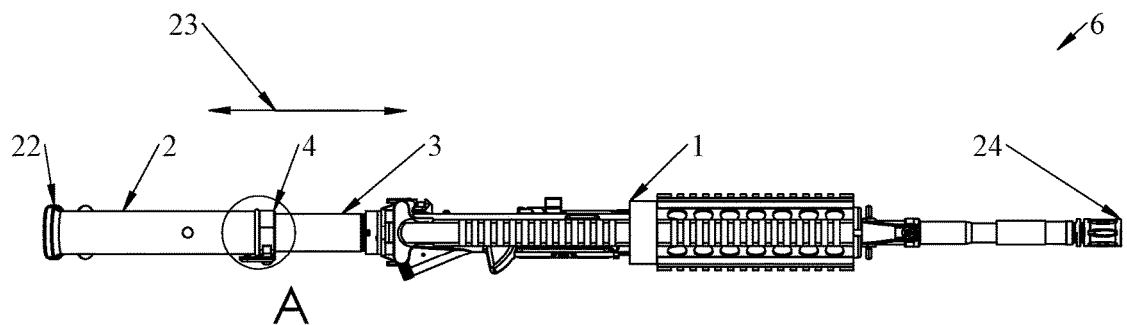
FIG. 2 is a top view of the present embodiment, installed on a AR-15 style firearms rear stock.

FIG. 2. Referring now to the present embodiment 4 in more detail, in FIG. 2 there is shown a top view of the present embodiment 4, installed on a AR-15 style firearms rear stock 5, 1, 3. The present embodiment 4 is in the closed position, attached to an AR-15 style firearm's 1 buffer tube and or stock shaft 3. The present embodiment's 4 installation on the buffer tube and or stock shaft 3 prevents the movement of the adjustable and or collapsible butt stock 2 in both the forward and backward directions, as indicated by directional arrow 23.

Figure 3:
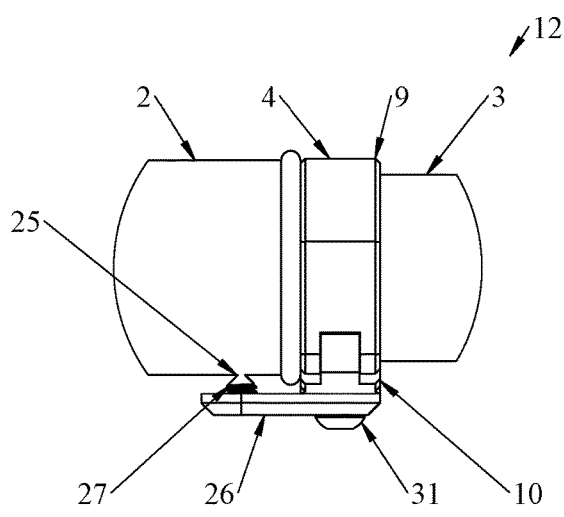
FIG. 3 is top detail view A, showing the present embodiment, installed on a AR-15 style firearms rear stock.

FIG. 3. Referring now to the present embodiment 4 in more detail, in FIG. 3, there is shown top detail view A, showing the present embodiment 4, installed on a AR-15 style firearms rear stock 6, 1, 3. When the present embodiment 4 is installed on a buffer tube and or stock shaft 3 the adjustable and or collapsible butt stock 2 is arrested from motion by the present embodiment 4. The present embodiment 4 has a lock plate 26 attached to the outside swing arm 10. The lock plate 26 holds a set screw 27, the tip of the set screw 25 makes contact with the adjustable and or collapsible butt stock 2 in order to create a mechanical lock between the present embodiment 4 and the adjustable and or collapsible butt stock 2.

Figure 4:
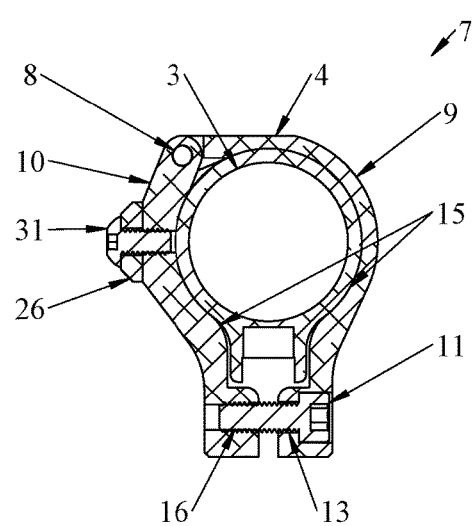
FIG. 4 is section view B, of the present embodiment, installed on a AR-15 style firearms rear stock.

FIG. 4. Referring now to the present embodiment 4 in more detail, in FIG. 4, there is shown section view B, of the present embodiment 4, installed on a AR-15 style firearms rear stock 7, 1, 3. The present embodiment 4 is locked to the buffer tube and or stock shaft 3 by the swing arm fastener 11 that joins the inside swing arm 9 and the outside swing arm 10 by passing a swing arm fastener 11 through the swing arm swing arm through hole 13 in the inside swing arm 9 and threading through the swing arm fastener tapped hole 16 in the outside swing arm 10. The hinge pin 8 is the pivot point of the inside swing arm 9 and outside swing arm 10. When the swing arm fastener 11 is tightened, the inside swing arm 9 and the outside swing arm 10 will pinch together in the area of the swing arm swing arm through swing arm hole 13 and swing arm fastener tapped hole 16, creating ample surface tension between the buffer tube and or stock shaft 3 and the inside curvature 15 of the present embodiment 4, preventing the inside swing arm 9 and the outside swing arm 10 from moving apart, slipping, sliding or otherwise becoming loose form the buffer tube and or stock shaft 3. Once the present embodiment 4 is installed on the buffer tube and or stock shaft 3 the present embodiment 4 will be permanently fixed to the buffer tube and or stock shaft 3 until the swing arm fastener 11 is removed. To set the present embodiment 4 in to the installed state shown, one will place the inside swing arm 9 and outside swing arm 10 around a buffer tube and or stock shaft 3 and pinch the two swing arms 9 and 10 form the outside, and then tighten the swing arm fastener 11. The inside curvature 15 of the inside swing arm 9 and the outside swing arm 10 matches the buffer tube and or stock shaft 3 in such a way that there is a tight and snug fit when the present embodiment 4 is in the closed position around a buffer tube and or stock shaft 3. When the swing arm fastener 11 is tightened, the inside curvature 15 of the two swing arms 9 and 10 will have created a strong pinching force, to ensure the present embodiment 4 is fixed in position on the buffer tube and or stock shaft 3, one then drives set screw 27 in to the adjustable and or collapsible butt stock 2.

Figure 5:
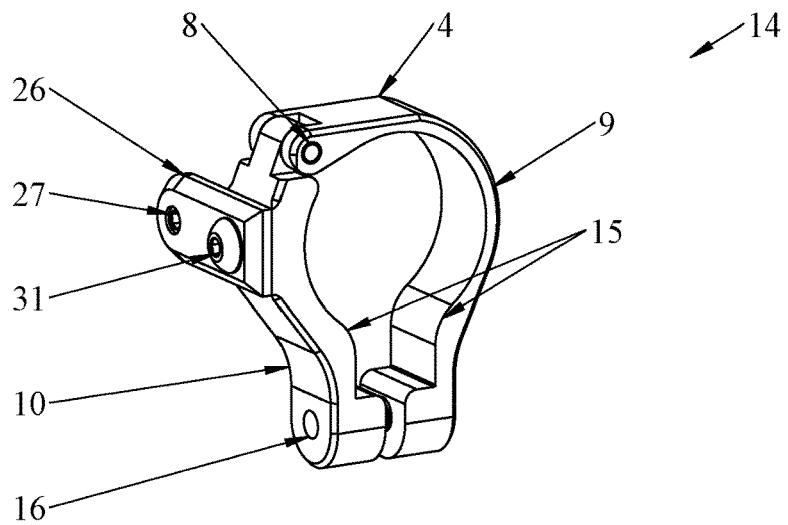
FIG. 5 is an isometric view of the present embodiment.

FIG. 5. Referring now to the present embodiment 4 in more detail, in FIG. 5, there is shown an isometric view of the present embodiment 4, 14. The present embodiment 4 has the inside curvature 15 of the inside swing arm 9 and the outside swing arm 10 shaped to match or fit well to a buffer tube and or stock shaft 3. The present embodiment 4 having an inside swing arm 9 and an outside swing arm 10, pivoting about a hinge pin 8. The outside swing arm 10 has attached to it a lock plate 26 attached by a lock plate fastener 31. The lock plate 26 also housing a set screw 27.

Figure 6:
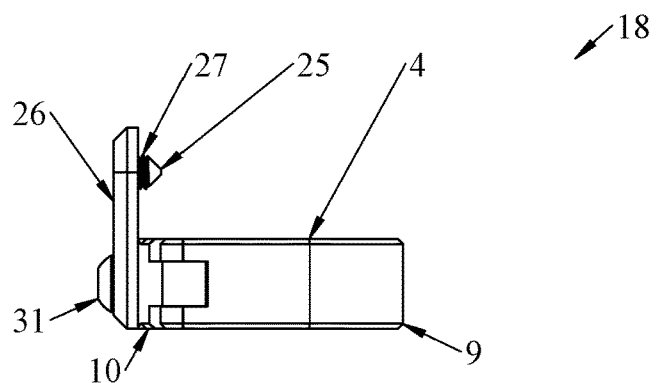
FIG. 6 is top view of the present embodiment.

FIG. 6. Referring now to the present embodiment 4 in more detail, in FIG. 6, there is shown a top view of the present embodiment 18, 4. The present embodiment 4 has a lock plate 26 attached to outside swing arm 10 by lock plate fastener 31. Lock plate 26 holds a set screw 27, the tip of set screw 25 is intended to secure the present embodiment 4 to the adjustable and or collapsible butt stock 2 portion of a firearms rear stock assembly 22.

Figure 7:
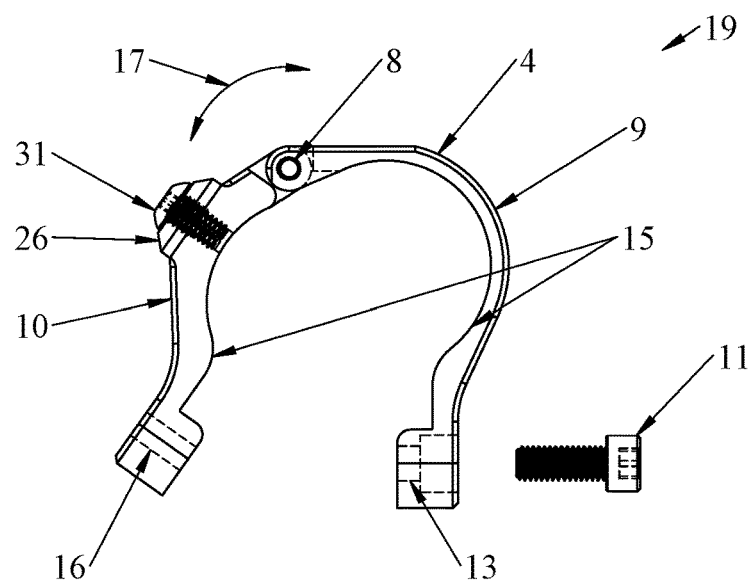
FIG. 7 is a front view of the present embodiment shown in an open state, with hidden lines dashed.

FIG. 7. Referring now to the present embodiment 4 in more detail, in FIG. 7, there is shown a front view of the present embodiment 4 shown in an open state, with hidden lines dashed 19. The present embodiment 4 hinges about a hinge pin 8. The present embodiment's 4 inside swing arm 9 and outside swing arm 10 move about the hinge pin 8 in a direction shown by path of motion 17. The swing arms 9 and 10, are joined together by swing arm fastener 11, which passes through a swing arm swing arm through hole 13 and threads in to swing arm fastener tapped hole 16. When the swing arm fastener 11 is sufficiently tightened, the inside curvature 15 is pinched to the buffer tube and or stock shaft 3 enough to fix the current embodiment 4 in place.

Figure 8:
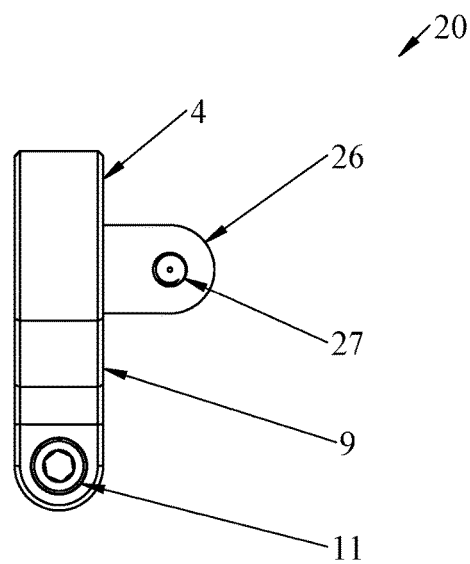
FIG. 8 is a side view of the present embodiment.

FIG. 8. Referring now to the present embodiment 4 in more detail, in FIG. 8, there is shown a side view of the present embodiment 4, 20. There is shown the inside swing arm 9, the swing arm fastener 11 that joins the swing arms 9 10, a lock plate 26 and a set screw 27 protruding from the lock plate 26.

Figure 9:
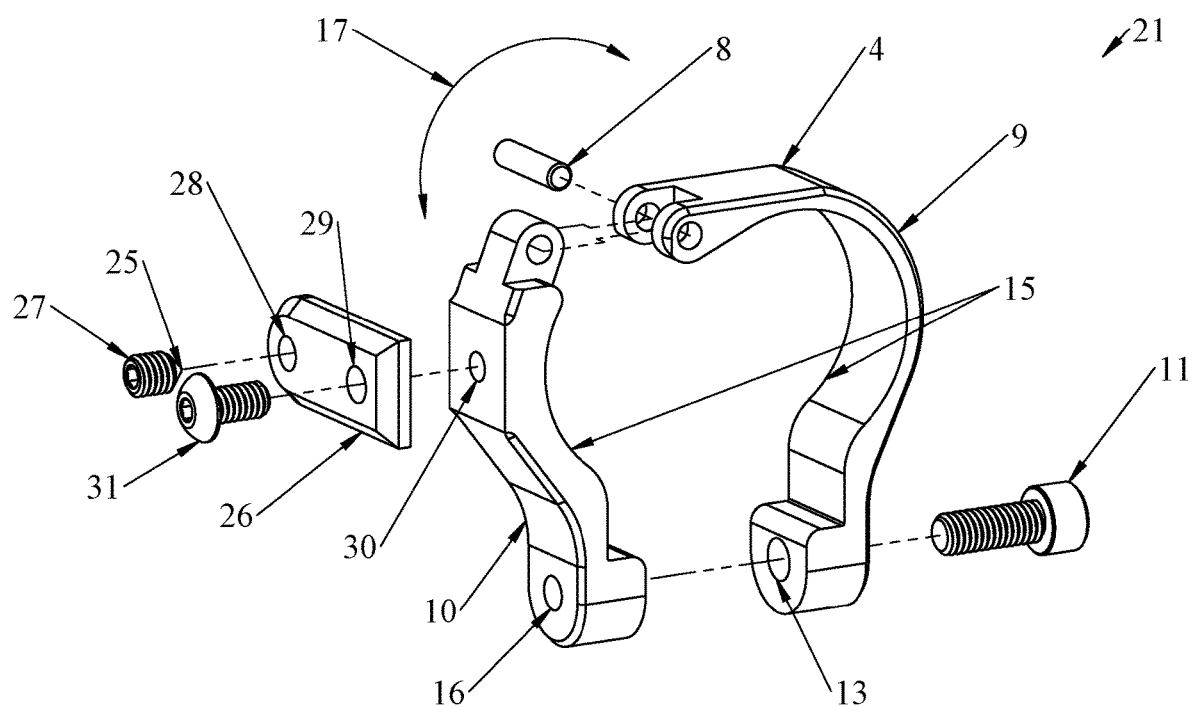
FIG. 9 is an exploded view of the present embodiment.

FIG. 9. Referring now to the present embodiment 4 in more detail, in FIG. 9, there is shown an exploded view of the present embodiment 4, 21. The present embodiment 4 is locked to the buffer tube and or stock shaft 3 by the swing arm fastener 11 that joins the inside swing arm 9 and the outside swing arm 10 by passing a swing arm fastener 11 through the swing arm swing arm through hole 13 in the inside swing arm 9 and threading through the swing arm fastener tapped hole 16 in the outside swing arm 10. The hinge pin 8 is the pivot point of the inside swing arm 9 and outside swing arm 10. The swing arms 9 and 10 move in the path of motion 17 around hinge pin 8. When the swing arm fastener 11 is tightened, the inside swing arm 9 and the outside swing arm 10 will pinch together in the area of the swing arm through hole 13 and swing arm fastener tapped hole 16, creating ample surface tension between the buffer tube and or stock shaft 3 and the inside curvature 15 of the present embodiment 4, preventing the inside swing arm 9 and the outside swing arm 10 from moving apart, slipping, sliding or otherwise becoming loose form the buffer tube and or stock shaft 3. Once the present embodiment 4 is installed on the buffer tube and or stock shaft 3 the present embodiment 4 will be permanently fixed to the buffer tube and or stock shaft 3 until the swing arm fastener 11 is removed. There is a lock plate 26 that is attached to the outside swing arm 10 with a lock plate fastener 31 that passes through a lock plate through lock plate through hole 29 and in to outside swing arm tapped hole 30, this fixes the lock plate 26 to the outside swing arm 10. The lock plate 26 houses a set screw 27 in lock plate tapped hole 28. The tip of set screw 25 passes through the lock plate tapped hole 28 in the lock plate 26 and is driven in to the adjustable and or collapsible butt stock 2 portion of a rear stock assembly 22.

OPERATION OF THE EMBODIMENT

Referring now to FIG. 2, the present embodiment 4 prevents the movement of the adjustable and or collapsible butt stock 2 when the adjustable and or collapsible butt stock 2 is slid up to the desired position of the present embodiment 4. The present embodiment 4 shown in FIG. 3 is installed and fixed to the buffer tube and or stock shaft 3 with a swing arm fastener 11, the tip of set screw 25 is driven in to the adjustable and or collapsible butt stock 2 and has now arrested the adjustable and or collapsible butt stock 2 from movement in the forward or backward direction, as shown by the directional arrow 23.

Referring now to FIG. 9, to install the present embodiment 4, the inside swing arm 9 is placed on a buffer tube and or stock shaft 3, the outside swing arm 10 follows the path of motion 17 toward the inside swing arm 9 until the swing arm through swing arm through hole 13 and the swing arm fastener tapped hole 16 are aligned in such a way that the swing arm fastener 11 can pass through the swing arm through swing arm through hole 13 and threaded in to the swing arm fastener tapped hole 16. The inside curvature 15 of the inside swing arm 9 and the outside swing arm 10 matches the buffer tube and or stock shaft 3 in such a way that there is a tight and snug fit when the present embodiment 4 is in the closed position around a buffer tube and or stock shaft 3. When the swing arm fastener 11 is tightened, the inside curvature 15 of the two swing arms 9 and 10 will have created a strong pinching force, to ensure the present embodiment 4 is fixed in position on the buffer tube and or stock shaft 3. One then attaches the lock plate 26 to the outside swing arm 10 with lock plate fastener 31, which passes through a lock plate through hole 29 and attaches in to outside swing arm tapped hole 30. One then drives set screws 27 tip of set screw 25 through lock plate tapped hole 28 and in to the adjustable and or collapsible butt stock 2. This arrests the movement of the adjustable and or collapsible butt stock 2 portion of a rear stock assembly 22.

ADVANTAGES

The advantages of the present invention include, without limitation, the easy installation of a mechanism that arrests the movement of an adjustable and or collapsible butt stock. The additional advantage is that the mechanism is installed easily on existing equipment that is readily available in today's marketplace. The advantage of the present invention, compared to the current method, which is riveting, gluing or otherwise damaging a rear stock assembly, one can now attach the present invention easily, in order to impede the movement of the stock without damaging the functionality of an adjustable and or collapsible but stock rear stock's assembly.

The present invention is also advantageous to those individuals who travel between differing states, states whose laws pertain to AR-15 style rifles differ. In the instance of traveling between states who regulate the functionality of the rear but stock and stats who do not regulate, one may simply add or remove the present invention in order to conform to the states particular law and or the individual's preference, without the fear of damaging or permanently breaking the mechanism that makes the rear stock adjustable or collapsible.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

DRAWINGS—REFERENCE NUMERALS

1. AR-15 style firearm
2. Adjustable and or collapsible butt stock
3. Buffer tube and or stock shaft
4. The present embodiment
5. Side view of the present embodiment, installed on an AR-15 style firearms rear stock
6. Top view of the present embodiment, installed on an AR-15 style firearms rear stock
7. Section view B of the present embodiment, installed on a AR-15 style firearms rear stock
8. Hinge pin
9. Inside swing arm
10. Outside swing arm
11. Swing Arm Fastener
12. Detail view A, showing the present embodiment, installed on a AR-15 style firearms rear stock
13. Swing Arm Through hole
14. An isometric view of the present embodiment
15. Inside curvature
16. Swing Arm Tapped hole
17. Path of motion
18. Top view of the present embodiment
19. Front view of the present embodiment shown in an open state, with hidden lines dashed
20. Side view of the present embodiment
21. Exploded view of the present embodiment
22. Rear stock assembly
23. Directional arrow
24. Front of the firearm
25. Tip of set screw
26. Lock plate
27. Set screw
28. Lock Plate Tapped hole
29. Lock Plate Through hole
30. Outside Swing Arm Tapped hole
31. Lock Plate Fastener

I claim:

1. A clamp preventing the collapsibility and adjustability of a firearm rear stock assembly, the rear stock assembly comprising a buffer tube having a cylindrical outer surface which is telescopically received within a cylindrical bore of a butt stock, the clamp comprising:

an inside swing arm and an outside swing arm, each swing arm comprising a partially-cylindrical ring portion having an inner surface approximately the same diameter as the outer surface of the buffer tube, a hinged portion at one circumferential end thereof and a fastening portion at the other circumferential end thereof;

wherein the inside swing arm is rotatably joined to the outside swing arm by a hinge pin extending through aligned holes in the hinged portions of the swing arms, and wherein the fastening portion of one of the swing arms comprises a fastener slot and the fastening portion of the other of the swing arms comprises a threaded hole;

wherein the inside swing arm and the outside swing are joined around the buffer tube such that the inner surfaces thereof correspondingly engage the outer surface of the buffer tube, and a swing arm fastener extends through the fastener slot and threadably engages the threaded hole to lock the clamp in a fixed position on the buffer tube, such that the rear stock assembly cannot be adjusted without first backing off the swing arm fastener;

a lock plate having a through hole and a threaded hole spaced along a length thereof;

wherein a lock plate fastener extends through the lock plate through hole and threadably engages a threaded hole in an outer surface of the ring portion of the outside swing arm to attach the lock plate thereto, and wherein the lock plate longitudinally-extends parallel to a longitudinal axis of the buffer tube and the clamp; and a set screw which threadably engages the lock plate threaded hole and extends therethrough to clamp against an outer surface of the butt stock, wherein the set screw is adjusted to focus pressure on the butt stock to prevent the collapsibility and adjustability of the firearm rear stock assembly.

2. The clamp of claim 1, wherein the hinge pin is located such that when the clamp is tightened via the swing arm fastener, the hinge pin is disposed in a location not at the top of the butt stock.

3. The clamp of claim 1, wherein the hinged portion of the outside swing arm comprises two spaced apart hollow tubes and the hinged portion of the inside swing arm comprises a single hollow tube disposed between the spaced apart hollow tubes, and wherein the hinge pin extends through aligned holes in the hollow tubes.

4. The clamp of claim 3, wherein the combination of the lengths of the two spaced apart hollow tubes and the single hollow tube is approximately equal to the hinge pin length.

5. The clamp of claim 4, wherein the hinge pin is inserted into the two spaced apart hollow tubes and the single hollow tube to allow the inside swing arm and the outside swing arm to rotate about the hinge pin.

6. The clamp of claim 1, wherein the set screw comprises a tip, and wherein the set screw can be rotated in and out of the lock plate threaded hole to affect an amount of pressure the tip places on the butt stock of the firearm.

7. The clamp of claim 6, wherein the amount of pressure can be increased to secure the clamp, thereby stopping the collapsibility and adjustability of a firearm rear stock assembly.

8. The clamp of claim 6, wherein the amount of pressure can be decreased to release the clamp, thereby allowing for the collapsibility and adjustability of a firearm rear stock assembly.

* * * * *